United States Patent
Kuraoka et al.

(10) Patent No.: US 6,843,921 B2
(45) Date of Patent: Jan. 18, 2005

(54) METHOD OF SEPARATION AND RECOVERY OF ELEMENTS FROM RADIOACTIVE LIQUID WASTES

(75) Inventors: Etsushu Kuraoka, Chiba (JP); Anyun Zhang, Chiba (JP); Mikio Kumagai, Chiba (JP); Masayuki Watanabe, Ibaraki (JP); Hirofumi Nakamura, Ibaraki (JP)

(73) Assignees: Institute of Research and Innovation, Tokyo (JP); Japan Nuclear Cycle Development Institute, Ibaraki (JP)

( * ) Notice: Subject to any disclaimer, the term of this patent is extended or adjusted under 35 U.S.C. 154(b) by 69 days.

(21) Appl. No.: 10/448,222

(22) Filed: May 30, 2003

(65) Prior Publication Data
US 2003/0234223 A1 Dec. 25, 2003

(30) Foreign Application Priority Data
Jun. 20, 2002 (JP) .................................... 2002-180390

(51) Int. Cl.⁷ ............................................... C02F 1/42
(52) U.S. Cl. ....................................................... 210/682
(58) Field of Search ......................................... 210/682

(56) References Cited
U.S. PATENT DOCUMENTS 5,863,439 A * 1/1999 Dietz et al. ................. 210/682

6,270,737 B1  8/2001 Zaitsev et al.

FOREIGN PATENT DOCUMENTS

| GB | 1 455 095 | 11/1976 |
|---|---|---|
| JP | 09-80194 A | 3/1997 |
| JP | 9-113689 A | 5/1997 |

* cited by examiner

Primary Examiner—Chester T. Barry
(74) Attorney, Agent, or Firm—Rothwell, Figg, Ernst & Manbeck (57) ABSTRACT

A method of separation and recovery of elements from radioactive liquid wastes, includes a step of bringing into contact a high-level radioactive liquid waste containing separation target elements including Americium, Curium, Zirconium, Molybdenum, Palladium and rare earth elements with solid absorbent containing organophosphorus compounds so that the separation target elements are absorbed in the solid absorbent, a step of bringing into contact the solid absorbent with an acidic solution containing diethylenetriaminepentaacetic acid so that Americium, Curium, Zirconium, Molybdenum, Palladium and heavy rare earth elements are eluted from the solid absorbent, and a step of bringing into contact the solid absorbent underwent the first elution step with water or dilute nitric acid so that light rare earth elements are eluted from the solid absorbent. With the method, elements, which include Americium, Curium, Zirconium, Molybdenum, Palladium and rare earth elements, are efficiently and economically separated and recovered from the radioactive liquid waste.

6 Claims, 4 Drawing Sheets

METHOD OF SEPARATION AND RECOVERY OF ELEMENTS FROM RADIOACTIVE LIQUID WASTES

BACKGROUND OF THE INVENTION

1. Field of the Invention

The present invention relates to a method of separating and recovering Americium (Am), Curium (Cm), Zirconium (Zr), Molybdenum (Mo), Palladium (Pd) and rare earth elements from radioactive liquid wastes.

2. Description of the Related Art

Generally, elements such as Americium (Am), Curium (Cm), Zirconium (Zr), Molybdenum (Mo), Palladium (Pd) and rare earth elements are included in liquid wastes derived from high-level radioactive wastes which are produced from spent nuclear fuel reprocessing and from nuclear substance producing and dissolving steps in nuclear power facilities, for example.

The high-level radioactive wastes produced in the nuclear power facilities are defined as radioactive wastes containing primarily the products of nuclear fission and transuranic elements such as radioactive elements having atomic number higher than 92. The product of nuclear fission and the transuranic elements are produced when valuable Uranium (U) or Plutonium (Pu) is recovered from the reprocessed spent nuclear fuel from nuclear power plants. The high-level radioactive wastes are produced in a liquid state from such reprocessing. In a spent nuclear fuel reprocessing method which is designated as a Pulex method performed on an industrial scale at present, a solvent-extraction method is used to recover Uranium and Plutonium which is extracted and seperated. The method includes a first step of dissolving the spent nuclear fuel in nitric acid and a later step of extracting Uranium and Plutionium using tri-butyl phosphate (hereafter, referred as TBP) as an extraction agent. The various kinds of products of nuclear fission and the transuranic elements contained in a nuclear fuel solution are present in the remainder of the extraction process, and this remainder is produced as a high-level radioactive waste. In a step of dissolving the spent nuclear fuel or a step of treating a remainder of the nuclear fuel solution, the high-level radioactive waste as described above is also produced. Furthermore, in some overseas institutions, high-level radioactive waste as described above is also produced when a nuclear substance such as Uranium or Plutonium is produced or dissolved.

Moreover, in regard to the high-level radioactive waste as described above, a disposition plan is underway. The plan includes a step of recovering the radioactive liquid waste using nitric acid, a step of concentrating the liquid waste by vaporization, a step of working the liquid waste into a glass solidification body, and a final step of storing the glass solidification body in a deep stratum.

The high-level radioactive liquid waste coexists with about forty nuclides in addition to a small amount of Uranium and Plutonium which is not able to be recovered completely using the reprocessing as described above. The nuclides include alkali metals such as Cesium (Cs), alkaline-earth metals such as Strontium (Sr), Barium (Ba), rare earth elements such as Neodymium (Nd), Cerium (Ce), Promethium (Pm), Yttrium (Y), minor actinide elements such as Neptunium (Np), Americium (Am), Curium (Cm), platinum-group metals such as Palladium (Pm), Rhodium (Ph), Ruthenium (Ru), Zirconium (Zr), Molybdenum (Mo), Niobium (Nb), Technetium (Tc). It is very important to separate various elements contained in the high-level radioactive liquid wastes into some element groups according to levels of radioactivity, the life span or exothermic properties of the elements in order to formulate a rational method of processing these substances with reference to the following parameters. These parameters are cost effectiveness and efficiency improvements in the disposition of wastes, the reduction of environmental loads, and the effective use of resources, for example.

Especially, it is an urgent necessity that technology with respect to separation and recovery from high-level radioactive liquid wastes of minor actinide elements such as Americium, Curium which are long-life nuclear species having a half-life of more than ten thousand years is established. It is useful that the established technology contributes to reduce the radioactive load on the environment in the long term and to improve the cost effectiveness and efficiency improvements in disposition of radioactive wastes in the deep stratum.

In certain countries worldwide, the development of the so-called separation-transformation technology has proceeded vigorously in recent years. This technology includes a step of separating and recovering the minor actinides such as Americium, Curium or the like from the high-level radioactive liquid wastes and a step of transforming the minor actinides to stable or short-life nuclear species in a nuclear reactor or accelerator. However, a method of effectively separating and recovering the minor actinides such as Americium, Curium or the like from the high-level radioactive liquid wastes is not yet established under present circumstances. Especially, since Americium or Curium and the rare earth elements in the high-level radioactive liquid wastes show similarity with respect to atomic structure and chemical properties, it is difficult to separate one from the other. Up until this time, research and development regarding various separation methods, which includes the solvent-extraction method using the extraction agent, have been vigorously pursued with the goal of separating and recovering Americium and Curium from the high-level radioactive liquid wastes. However, a separating and recovering method which satisfies cost effectiveness and efficiency has not yet been developed, and is not yet in actual use on an industrial scale under present circumstances.

A typical solvent-extraction method is the well-known TRUEX method. The TRUEX method includes a step of dissolving octyl(phenyl)-N,N-diisobutylcarbamoylmethylphosphine oxide (hereafter, referred as CMPO) and TBP mixed solvent in hydrocarbon base solvent such as dodecane or the like to prepare an organic solvent, and a step of bringing the high-level radioactive liquid wastes into contact with the organic solvent (hereafter, referred as CMPO-TBP mixed solvent or organic phase) to extract and separate the Americium and Curium from the liquid wastes. In other words, according to the TRUEX method, three valences of actinides such as Americium and Curium are extracted in the CMPO-TBP mixed solvent. On the other hand, the great majority of metal elements in the high-level radioactive liquid wastes is not extracted in the CMPO-TBP mixed solvent, and remains in an aqueous phase. The extraction property of three valences of rare earth elements in the CMPO-TBP mixed solvent is however similar to that of the three valences of actinides. Since the rare earth elements are therefore extracted together with the Americium and the Curium, it is impossible to separate the three valences of actinides from the rare earth elements.

In order to separate the three valences of actinides from the rare earth elements in the high-level radioactive liquid wastes in recent years, a new solvent-extraction method is proposed (referred to JP-A-80194/9). The new method uses the CMPO-TBP mixed solvent in combination with aminopolyacetic acid based complex such as diethylenetriaminepentaacetic acid (hereafter, referred as DTPA). With the method, initially the high-level radioactive liquid wastes are mixed with the CMPO-TBP mixed solvent, and both the three valences of actinides and the rare earth element in the liquid wastes are extracted in the CMPO-TBP mixed solvent. Salting-out agents such as sodium nitrate ($NaNO_3$) are then added to the organic phase to cleanse and remove the nitric acid from the organic phase. A solution, which contains the three valences of actinides, DTPA having complex-forming ability enhanced and the salting-out agent, is then added to the organic phase to extract backward the three valences of actinides from the organic phase to the aqueous phase. In this way, since the rare earth elements remain in the organic phase, the three valences of actinides are separated from the rare earth elements. According to the method, it is possible to separate the three valences of actinides and the rare earth elements from the high-level radioactive liquid wastes, and to separate nicely the three valences of actinides from the great majority of the rare earth elements (light rare earth elements as main elements).

Since the salting-out agent including several mole per liter of sodium nitrate is however used in the step of separating the three valences of actinides from the rare earth elements, the method has a problem producing a radioactive waste containing high concentration of salts difficult to dispose. Since a high concentration of TBP of more than 1 mole per liter is dissolved in a organic diluent such as dodecane in addition to the CMPO as the organic solvent, the method entails the problem that it produces a large amount of the organic liquid waste which poses processing difficulties in later steps. Furthermore, with the method of using the CMPO-TBP mixed solvent, Zirconium, Molybdenum and Palladium contained in the high-level radioactive liquid wastes are extracted together with the three valences of actinides and the rare earth elements in the organic solvent. It is therefore impossible to separate Zirconium, Molybdenum and Palladium from the three valences of actinides and the rare earth elements.

Moreover, a typical method of separation Americium and Curium from the rare earth elements includes a separation method using extraction chromatography instead of the solvent-extraction method described above. The extraction chromatography is performed between a solid phase, which impregnates a porous carrier with the CMPO and the TBP, and an aqueous phase, which includes an organic acid-based complex agent such as DTPA (referred to JP-A-113689/9). With the separation method, a disposal target is a mixed product solution containing Americium, Curium and the rare earth elements, which are separated from other elements in the high-level radioactive liquid wastes according to the well-known TRUEX method. The mixed product solution is passed through the solid phase taking the form of a column so that the Americium, the Curium and the rare earth elements are absorbed in the solid phase. The method separates Americium and Curium from the tare earth elements, with the help of variations in moving speed of each individual element ion in the column when the solution passes through the solid phase. With the method, when the complex agent solution such as DTPA is passed through the solid phase, Americium, Curium and a small amount of the rare earth elements (mainly heavy rare earth elements) are removed from the column in a former stage. On the other hand, a large amount of the rare earth elements (mainly light rare earth elements) is removed from the column in a later stage, and it is possible to separate the former from the later.

Separation of the three valences of actinides from the rare earth elements according to the method above is based on the difference in the complex-forming ability between Americium, Curium and the rare earth elements and the complex agent-such as DTPA. It is therefore possible to perform a neat separation of the three valences of actinides from the large amount of the rare earth element (primarily light rare earth elements). However, if the method above is applied directly to the separation Americium and Curium from the rare earth elements in high-level radioactive liquid wastes, absorptive fission products, which include Zirconium, Molybdenum or Palladium, are also absorbed in the CMPO absorbent. Furthermore, the fission products are separated together with Americium and Curium from the absorbent owing to the DTPA. It is therefore impossible to separate Americium and Curium from the absorptive elements. In order to apply the method above to the separation Americium and Curium from the rare earth elements, it is necessary to perform a previous process of separating and recovering Americium, Curium and the rare earth elements from the high-level radioactive liquid wastes. If such a previous solvent-extraction process is performed, the cost effectiveness of and the improvements to the efficiency of the whole separating-recovering process undergo remarkable deterioration as additional separation facilities to the existing ones must be added and the volume of process solution, and the varieties and amount of separation reagent in the new process are increased noticeably. The new process furthermore results in increasing markedly the volume of the radioactive liquid wastes difficult to dispose in a later step.

Moreover, a proposed method includes a step of absorbing the transuranic elements such as Americium and Curium from the radioactive liquid wastes in an absorbent and a step of separating the elements from the absorbent using the dilute nitric acid to recover them (referred to JP-A2-97155/7 and JP-A2-97156/7). Here, the absorbent is prepared by impregnating a resinous particle supporting body such as Amber-Light XAD-4 with the CMPO, dihexyl-N,N-diethylcarbamoylmethphosphonate (hereafter, referred as CMP) or a mixture of the substances with TBP. According to the method, it is possible to separate the absorptive elements such as Americium and Curium from non-absorptive elements such as Strontium or iron in the high-level radioactive liquid wastes. With the method, since the rare earth elements have approximately the same property of absorption as Americium or Curium with respect to the CPM or the CMPO and furthermore have approximately the same property of separation as Americium or Curium when the dilute nitric acid is used. Therefore, it is impossible to separate the rare earth elements from Americium or Curium. Moreover, it is also impossible to separate and recover the absorptive elements such as Zirconium, Molybdenum or Palladium, which are absorbed in the CMP or the CMPO.

Moreover, oxides of Zirconium or Molybdenum have high melting points, respectively. When the glass solidification body is made from the high-level radioactive liquid wastes, it is necessary to raise a heat temperature according to the melting point of the oxide above. Furthermore, since the oxides of Zirconium or Molybdenum weaken the mechanical strength of the glass solidification body, content of the wastes in the glass must be limited. Therefore, it comes to increase in volume of the glass solidification body as a whole.

On the other hand, Zirconium and Molybdenum contained in the high-level radioactive liquid wastes are almost stable nuclear species having low levels of radioactivity. If Zirconium and Molybdenum are separated from the high-level radioactive liquid wastes, the separated product may be disposed acceptably as low-level radioactive liquid wastes. However, since Zirconium and Molybdenum contained in the high-level radioactive liquid wastes have complex chemical configurations or complex behavior, effective separation and elimination methods have not been developed at the present time.

Furthermore, Palladium contained in the high-level radioactive liquid wastes is deposited as metals under high temperature by an application of heat. The deposited Palladium displays a conspicuous tendency to prevent the preparation of a homogeneous solidification body.

On the other hand, the Palladium contained in the high-level radioactive liquid wastes is of interest due to the fact that it is a potential resource with extremely high levels of radioactivity and having great value when used in electrode materials such as fuel cells and in chemical catalysis. In order to separate and recover the Palladium, research and development with respect to electrolytic reduction methods, solvent-extraction methods or ion-exchanging methods are under continual development. However, separation and elimination methods, which are adequate with respect to cost effectiveness and efficiency, have not yet been developed.

As described above, with the conventional method of separating and recovering Americium and Curium from the high-level radioactive liquid wastes produced from spent nuclear fuel reprocessing and from nuclear substance producing and dissolving steps in nuclear power facilities, the specific elements cannot be separated economically from another with efficiency. Consequently there is a problem that the conventional method has a possibility of preventing the development of the separation-transformation technology.

Moreover, with the conventional method, if Zirconium, Molybdenum and Palladium are contained in the high-level radioactive liquid wastes, there is a possibility that these elements will prevent the process of preparing the glass solidification bodies and furthermore result in increases in the used amount of the glass solidification material. This point constitutes one of the principal factors preventing cost effectiveness and efficiency improvements in processing of high-level radioactive liquid wastes.

With the conventional method, Palladium cannot be separated and recovered from the high-level radioactive liquid wastes. The conventional method has a further problem that the valuable Palladium resource is not used effectively.

SUMMARY OF THE INVENTION

The object of the present invention is to provide a method of separating and recovering elements such as Americium, Curium, Zirconium, Molybdenum, Palladium and rare earth elements from the high-level radioactive liquid wastes produced from spent nuclear fuel reprocessing and nuclear substance producing and dissolving steps in nuclear power facilities.

Accordingly, it is an object of the present invention to provide a method of separation and recovery of elements from radioactive liquid wastes, including a first absorption step of bring a high-level radioactive liquid waste containing separation target elements including Americium, Curium, Zirconium, Molybdenum, Palladium and rare earth elements into contact with solid absorbent containing organophosphorus compounds so that the separation target elements are absorbed in the solid absorbent; a first elution step of bringing the solid absorbent into contact with an acidic solution containing diethylenetriaminepentaacetic acid so that Americium, Curium, Zirconium, Molybdenum, Palladium and heavy rare earth elements are eluted from the solid absorbent; and a second elution step of bringing the solid absorbent from the first elution step into contact water or dilute nitric acid so that light rare earth elements are eluted from the solid absorbent. In this way, in the first absorption step, Americium, Curium, Zirconium, Molybdenum, Palladium and the rare earth elements can be absorbed in the solid absorbent. In the first elution step, Americium, Curium, Zirconium, Molybdenum, Palladium and the heavy rare earth elements can be eluted from the solid absorbent with efficiency. In the second elution step, light rare earth elements can be separated and recovered from other elements with efficiency.

With the above arrangement, it further includes a separated solution preparation step of adjusting acid concentration of a separated solution to 1 mole per liter to 6 mole per liter, the separated solution containing Americium and Curium obtained in the first elution step; a second absorption step of bringing into contact the separated solution, whose acid concentration is adjusted in the separated solution preparation step, with solid absorbent containing organophosphorus compounds so that Americium, Curium, Zirconium, Molybdenum, Palladium and heavy rare earth elements are absorbed in the solid absorbent; and a third elution step of bringing into contact the solid absorbent obtained in the second absorption step with water or dilute nitric acid so that Americium, Curium and heavy rare earth elements are eluted from the solid absorbent. In this way, it is possible to separate Palladium from other elements in the separated solution. Since Zirconium and Molybdenum are held on the solid absorbent, it is possible to separate the elements from Americium, Curium and the heavy rare earth elements with efficiency.

With the above arrangement, it further includes a fourth elution step of bringing into contact the solid absorbent with an acidic solution containing diethylenetriaminepentaacetic acid so that Zirconium and Molybdenum are eluted from the solid absorbent. In this way, it is possible to separate and recover Zirconium and Molybdenum from the solid absorbent with efficiency.

With the above arrangement, the solid absorbent containing organophosphorus compounds may be a solid absorbent including a complex-carrier having porous silica carrier particles holding organic macromolecular polymers, the complex-carrier holding at least one of octyl(phenyl)-N,N-diisobutylcarbamoylmethylphosphine oxide or dihexyl-N,N-diethylcarbamoylmethphosphonate. In this way, since the separation target elements of the high-level radioactive liquid wastes are absorbed selectively in the solid absorbent, it is possible to improve the cost effectiveness and efficiency improvements in disposition of the radioactive liquid wastes.

According to the present invention, the CMPO or the CMP is used as the solid absorbent without diluting the CMPO or the CMP with the hydrocarbon base diluent such as dodecane, without using an organic solvent such as TBP. It is therefore possible to reduce the amount of the radioactive liquid wastes which pose processing difficulties in later steps.

According to the present invention, salts containing metal salts or ammonium are not used in the processing step. It is therefore possible to prevent high concentration salts-containing radioactive liquid wastes from production.

DESCRIPTION OF THE PREFERRED EMBODIMENT OF THE INVENTION

Embodiment 1

Figure 1:
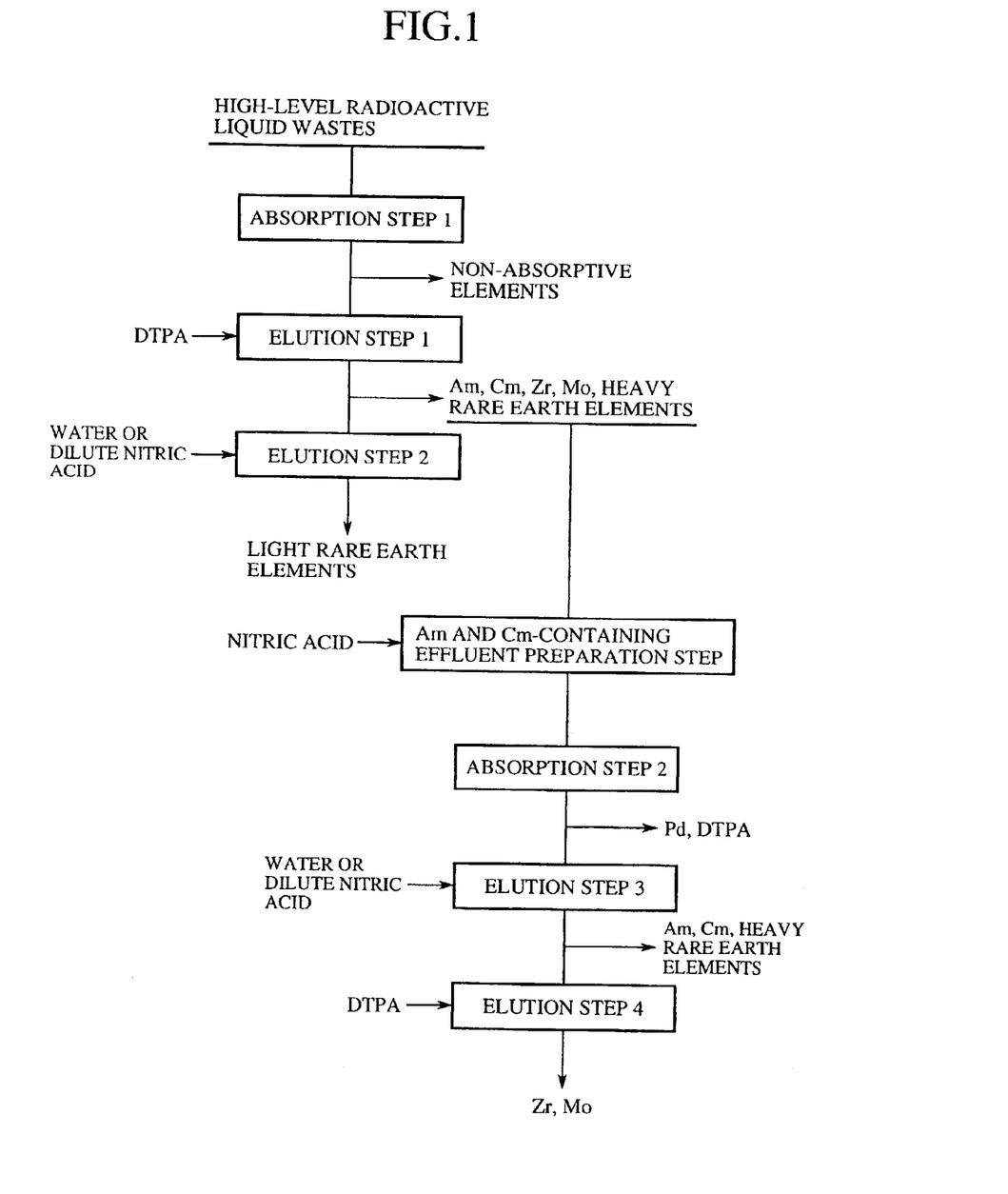
FIG. 1 is a flowchart of a general outline of a method of separation and recovery of elements from high-level radioactive liquid wastes.

A general outline of a method of separation and recovery of elements from high-level radioactive liquid wastes according to the present invention will be further explained in detail at each step. FIG. 1 is a flowchart of a general outline of a method of separation and recovery of elements from high-level radioactive liquid wastes.

1. Absorption Step 1 (First Absorption Step)

High-level radioactive liquid wastes, which are produced from spent nuclear fuel reprocessing and nuclear substance producing and dissolving steps in nuclear power facilities, are nitric acid solutions containing approximately 1 mole per liter to 6 mole per liter of nitric acids in most instances. It is possible to use just the nitric acid solutions as the processing solution, and to use the nitric acid solutions subjected to a concentration process such as vaporization in some cases.

Moreover, the high-level radioactive liquid wastes may be hydrochloric acid, sulfuric acid or fluoric acid solutions in some cases, instead of the nitric acid solutions. The method above according to the present invention is not peculiar to the nitric acid liquid wastes, and may be similarly applicable to hydrochloric acid, sulfuric acid or fluoric acid liquid wastes. In this case, the elution operation with respect to elements can be performed as in nitric acid liquid wastes, except that hydrochloric acid, sulfuric acid or fluoric acid is used as separation solutions, adjustment solutions or cleaning solutions, instead of nitric acid. Hereafter, a case of nitric acid liquid wastes (hereafter, referred also as process liquid) will be explained for the sake of convenience.

With the present invention, the process liquid is placed in contact with the absorbent so that the absorptive elements such as Americium, Curium, Zirconium, Molybdenum, Palladium and the rare earth elements, which are contained in the process liquid, are absorbed in the absorbent. In this way, it is possible to separate the absorptive elements from the non-absorptive elements such as Cesium, Strontium, Rhodium or Ruthenium contained in the process liquid.

A well-known column-style or batch-style absorptive operation may preferably be used. In other words, with the column-style operation, the process liquid is passed through the column filled with the absorbent so that the absorptive elements contained in the process liquid are absorbed in the absorbent. With the batch-style operation, the process liquid and the absorbent contained in a vessel are agitated or shaken so that the absorptive elements contained in the process liquid are absorbed in the absorbent. Moreover, after the absorptive elements are absorbed in the absorbent, a cleansing step of using a nitric acid solution, which has approximately the same concentration as the process liquid, is performed to cleanse gaps formed at the absorbent. In this way, it is possible to remove all of the non-absorptive elements from the absorbent.

The CMPO absorbent, the CMP absorbent or a combination thereof may be used as the absorbent. These substances display superior absorbing properties for Americium, Curium, Zirconium, Molybdenum, Palladium and the rare earth elements when compared with other absorbents. Moreover, a solid absorbent, which is prepared by mixing the CMPO or the CMP with a cooperative extraction agent such as TBP, may be used. The well-known CMPO or CMP containing resinous particles (CMPO or CMP bonded chemically to a matrix of organic high polymer), or organic high polymer beads whose pores are impregnated with CMPO or CMP are known as an absorbent.

On the other hand, the absorptive speed of ions from liquid to the solid absorbent and the separation speed of ions from the solid absorbent to the liquid are both determined by the diffusion-speed of ions in the solid absorbent. The well-known CMPO or CMP containing resin-type absorbent or the organic high polymer beads, whose pores are impregnated with CMPO or CMP, based solid absorbent is slow in absorbing element ions of the process liquid and in separating the element ions from the solid absorbent. The solid absorbents display poor efficiency in separation. If the size of each absorbent particle is reduced, it is possible to improve both the absorption and separation speeds. Conversely, since the polymer has a property of swelling in an aqueous phase, there is a remarkable pressure loss when the column-style separation is performed and the process liquid is passed through the column. The increase in the pressure loss reduces the level of safety with respect to the column-style separation. Especially, safe operation during separation is the most important problem when the radioactive liquid wastes are processed.

The present inventors have put considerable care into solving the problem of developing a new absorbent which includes a complex-carrier having porous silica carrier particles holding organic high polymers and which is impregnated with at least one of CMPO or CMP. The absorbent is prepared by impregnating a silica/polymer complex-carrier with CMPO or CMP. The silica/polymer complex-carrier is obtained by polymerizing porous high polymers such as styrene-divinylbenzen base or acrylic base in the pores of spherical porous silica particles having small diameters of several ten microns to several hundred microns. With the silica/polymer complex-carrier-type absorbent, since the polymer material is held in the pores of silica, the swelling of the polymers in the aqueous phase is restricted effectively to reduce pressure loss produced on passing it through the column as compared with the well-known CMPO or CMP absorbents. Furthermore, since the CMPO or CMP containing polymer part is dispersed and held in the silica particles having small pores, the polymer part has absorptive and separation speeds far faster than the well-known CMPO or CMP absorbent.

Figure 2:
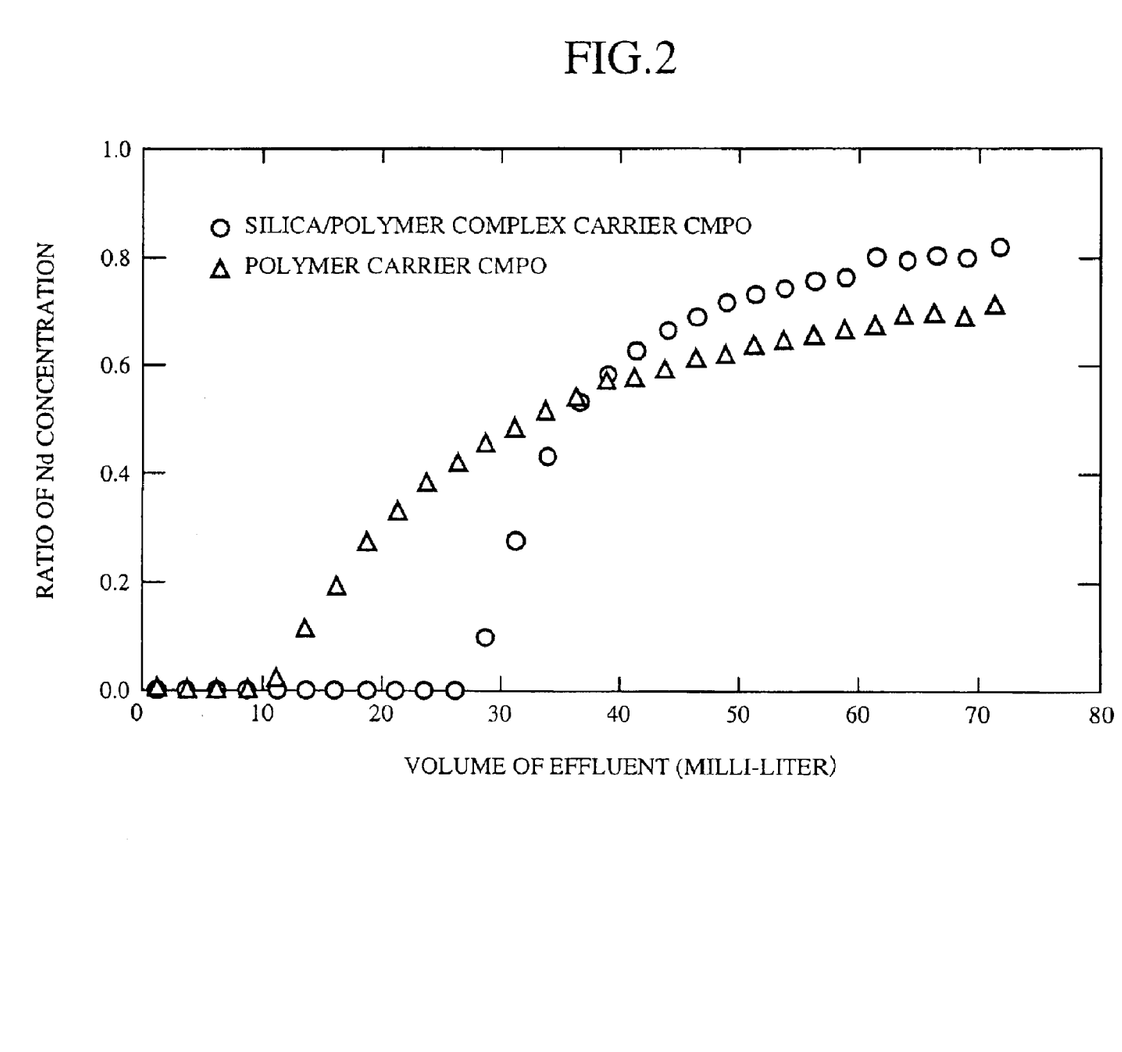
FIG. 2 is a graph of breakthrough curves with respect to absorption of Neodymium absorbed in a silica/polymer complex-carrier holding-type CMPO absorbent and a polymer carrier holding-type CMPO absorbent in solutions.

Examples of test conclusions showing variations in absorption speed of each individual absorbent will be illustrated in FIG. 2. FIG. 2 is a graph of breakthrough curves with respect to absorption of Neodymium absorbed in a silica/polymer complex-carrier holding-type CMPO absorbent and a polymer carrier holding-type CMPO absorbent in solutions. The silica/polymer complex-carrier holding-type absorbent is prepared in the following steps. Namely, the interior of porous silica particles each having 50 micrometers of diameter and 0.6 micrometers of bore size is co-polymerized with styrene-divinylbenzen to make a silica/polymer complex-carrier. The silica/polymer complex-carrier is then impregnated with a solution obtained by dissolving the commercially available CMPO extraction agent (Hokko Chemical) in a dichloromethane solvent. The solvent is vaporized to obtain the silica/polymer complex-carrier holding-type absorbent. The polymer carrier holding-type absorbent is prepared in the same manner above except that the commercially available Amber-Light XAD-4 (one of the most typical polymer carriers) carrier particles each having approximately 450 micrometers of diameter is used. Each of the absorbents holds 0.5 grams of CMPO per one gram of the carrier. FIG. 2 shows, when 10 milli-mole per liter of Neodymium (III)-containing 0.3 mole per liter of the nitric acid solution is passed through the respective CMPO absorbents-packed column, curves (absorption breakthrough curves) of the ratio of the concentration of Neodymium in column effluent to the previous concentration of Neodymium. As seen from FIG. 2, in a case where the polymer carrier holding-type absorbent is used, Neodymium starts to be discharged from the column when approximately 12 milli-liter of the process liquid is supplied to the column and the breakthrough curve shows the mild rise. In contrast to the absorbent above, in a case where the silica/polymer complex carrier holding-type absorbent is used, Neodymium starts to be discharged from the column when approximately 27 milli-liter of the process liquid is supplied to the column and the breakthrough curve shows a sharp rise. In other words, the absorption speed shown in the silica/polymer complex carrier holding-type absorbent is improved remarkably as compared with the absorption speed shown generally in the polymer carrier holding-type absorbent.

Moreover, the amount of CMPO or the CMP in the absorbent is not limited to the value above, and it is preferred that approximately 0.1 gram to 1 gram of CMPO or the CMP per one gram of carrier is used. The present inventors found that the higher the amount of CMPO or the CMP in the absorbent, the higher the amount of absorbed elements such as Americium, Curium, Zirconium, Molybdenum, Palladium and rare earth elements and the slower speed of absorption and separation (hereafter, referred also as desorption). The present inventors furthermore found that the CMP absorbent has a weaker absorption force with respect to the elements described above than the CMPO absorbent, and that the CMP and CMPO absorbents display similar properties with respect to separation and elimination of specific elements. Temperature in absorption also is not limited to a specific value, and it is preferred that a range from room temperature to 80° C., which is feasible industrially and easily maintained, is used. Moreover, owing to raising the temperature, it is possible to improve the speed of absorption and separation to some extent.

2. Elution step 1 (First Elution step)

The present inventors have considered carefully various agents and conditions during the separation in order to separate selectively Americium, Curium, Zirconium, Molybdenum, Palladium and a part of the rare earth elements (as main elements contained, atomic number 39 of Yttrium (Y) and atomic numbers 63 to 71 of elements, hereafter referred as heavy rare earth elements) from the remainder of the rare earth elements (main atomic number 57 to 62 of elements, hereafter referred as light rare earth elements). As a result of the consideration, the present inventors found an effective method. The method includes a step of separating Americium, Curium, Zirconium, Molybdenum, Palladium and the heavy rare earth elements from other elements using the DTPA-containing nitric acid solution and a later step of separating the light rare earth elements using pure water or dilute nitric acid.

The DTPA is a complex agent having a property of dissolving in acidic solutions, has a strong ability to form a complex with Americium, Curium, Zirconium, Molybdenum, Palladium and heavy rare earth elements, and has a comparatively weak ability to form a complex with light rare earth elements. When the DTPA-containing solution is therefore used as an elution agent, it is possible to perform selectively elution of Americium, Curium, Zirconium, Molybdenum, Palladium and the heavy rare earth elements as a water soluble DTPA complex from the absorbent to shift the elements to the aqueous phase. As a matter of course, the concentration and amount of the DTPA solution used as the elution agent depend on the amount of Americium, Curium, Zirconium, Molybdenum, Palladium or the heavy rare earth elements absorbed in the absorbent, and are determined by the stoichiometry of the complex-forming reaction. The sufficient elution is performed usually using the DTPA equivalent of one time to approximately ten times as much as the chemical equivalent of these elements. Here, the concentration of Americium, Curium, Zirconium, Molybdenum, Palladium or the heavy rare earth elements in total may be assumed to be in the range of 0.01 mole/liter to 0.1 mole/liter in the previous process liquid. In this case, when 0.01 mole/liter to 0.1 mole/liter of the DTPA solution, which has amount of liquid equivalent of one time to several times as much as the process liquid, is supplied to the process liquid, it is possible to perform an effective elution. The acidity of the DTPA solution used as the elution agent is in the range of pH 0 to approximately pH 4, and preferably in the range of pH 1 to pH 3. When the pH is zero or less and in the strong acidic zone, the complex-forming ability defined between the DTPA and Americium is weakened, and an effective elution is not performed. On the other hand, when the pH is four or more, the great majority of the light rare earth elements are separated together with the DTPA, and the separation property from Americium deteriorates.

With the elution operation, the column-style or batch-style process can be performed as in the case of the absorption step 1 described above. When the absorbent comes into contact with the solution containing the elution agent, Americium, Curium, Zirconium, Molybdenum, Palladium or the heavy rare earth elements from the absorbent are eluted to shift the elements to a solution phase. The temperature in the elution operation may be preferably in the range from room temperature to 80° C., which is feasible industrially and easily maintained. Another elution step described hereafter can be performed as in the case of the elution step 1.

3. Elution Step 2 (Second Elution Step)

Following the elution step 1, when pure water or dilute nitric acid as the elution agent is supplied to the solution, the light rare earth elements remaining in the absorbent are eluted. The light rare earth elements are absorbed in the absorbent in the form of a nitric complex in the absorption step. The supply of pure water or dilute nitric acid reduces the concentration of nitric ions in the absorbent to a lower level, and the nitric complex is dissociated and shifts the elements to the aqueous phase. Moreover, the lower the concentration of nitric ions acting as the elution agent in the solution the faster the elution speed. However, in order to avoid producing a precipitate owing to the hydrolytic degradation of the rare earth elements, it is necessary to keep the pH value of the effluent to approximately 5 or less.

4. Americium and Curium-containing Effluent Preparation Step

With the present invention, in order to separate and remove Zirconium, Molybdenum or Palladium from the effluent containing Americium, Curium, Zirconium, Molybdenum, Palladium or the heavy rare earth elements, the separation process including absorption and elution steps (the following absorption step 2 and elution step 3) is performed again. The concentration of nitric acid in the effluent is adjusted to the range of 1.0 mole/liter to 6 mole/liter in advance of the separation process. Since the absorbent has poor the absorptive property of Americium and so on when the concentration of the nitric acid is less than 1.0 mole/liter, it is difficult to absorb effectively the elements. On the other hand, since the nitric acid in the solution is absorbed when the concentration of the nitric acid is higher than 6 mole/liter, there is a possibility of inhibiting the absorption of Americium and so on. Moreover, the adjustment of the concentration of nitric acid is performed easily by adding a strong solution of nitric acid to the solution.

5. Absorption Step 2 (Second Absorption Step)

When the effluent produced in the adjustment of the concentration of nitric acid as the process liquid comes into contact again with the absorbent, Americium, Curium, Zirconium, Molybdenum or the rare earth elements (the heavy rare earth elements as main elements contained and a small amount of the light rare earth elements mixed in the elution step 1) is absorbed in the absorbent. After supplying the process liquid, the absorbent is cleansed using a solution of nitric acid of approximately the same amount as the process liquid. Moreover, the DTPA is contained in the process liquid. Since Palladium having the extremely strong complex-forming ability with respect to the DTPA is not absorbed in the absorbent and remains together with the DTPA in the process liquid and the cleansing liquid, Palladium is separated from the Americium, Curium, Zirconium, Molybdenum and the rare earth elements. With the absorption operation, use of the well-known column-style or batch-style process is preferred as in the case of the absorption step 1 described above.

6. Elution Step 3 (Third Elution Step)

The present inventors have considered carefully various agents and conditions in the separation in order to separate selectively Americium, Curium and the rare earth elements, which are absorbed in the absorbent in the absorption steps, from Zirconium and Molybdenum. As a result of the consideration, the present inventors found an effective method. The method includes a step of separating Americium, Curium and the rare earth elements, which are absorbed in the absorbent, from other elements using pure water or dilute nitric acid and a later step of eluting Zirconium and Molybdenum using the DTPA-containing nitric acid solution.

The principle and operation of the elution step 3 are the same as in the case of the elution step 2. When pure water or dilute nitric acid acting as the elution agent is supplied to the solution, Americium, Curium and the rare earth elements, which are absorbed in the absorbent, are eluted. In this case, since Zirconium and Molybdenum are not eluted and remain in the absorbent, the elements are separated from Americium, Curium and the rare earth elements.

7. Elution Step 4 (Fourth Elution Step)

Following the elution step 3, the elution is performed using the DTPA-containing nitric acid solution as in the case of the elution step 1 in order to elute Zirconium and Molybdenum remained in the absorbent. When the DTPA is used as the elution agent, Zirconium and Molybdenum form a water-soluble complex with the DTPA and shift the elements absorbed in the absorbent to the aqueous phase. Moreover, the present inventors found that the elution speed of Zirconium and Molybdenum using the DTPA is accelerated remarkably when the absorbent is cleansed using approximately 1 mole/liter to 6 mole/liter of the nitric acid solution in advance of the elution using the DTPA.

EXAMPLE 1

The example 1 is one example of a test to separate and recover elements from a process liquid simulating the high-level radioactive liquid wastes produced in the spent nuclear fuel reprocessing. Hereafter, the test will be explained in accordance with procedures thereof.

(1) Process Liquid Preparation Step 1

Each nitrate of Strontium (Sr), Lanthanum (La), Cerium (Ce), Neodymium (Nd), Samarium (Sm), Europium (Eu), Gadolinium (Gd), Yttrium (Y), Zirconium (Zr), Palladium (Pm) and Ruthenium (Ru), or ammonium salt of molybdic acid was picked up as typical elements contained in the high-level radioactive liquid wastes. The each salt was dissolved in 3 mole/liter of nitric acid solution in accordance with the composition in Table 1 to obtain a process liquid (high-level radioactive liquid wastes-simulating solution) used for the test of separating and recovering the elements.

TABLE 1

COMPOSITION OF PROCESS LIQUID FOR SEPARATION AND RECOVERY TEST (HIGH-LEVEL RADIOACTIVE LIQUID WASTES-SIMULATING SOLUTION)

| CONSTITUENT | Sr | La | Ce | Nd | Sm | Eu | Gd | Y | Zr | Mo | Pd | Ru | NITRIC ACID |
|---|---|---|---|---|---|---|---|---|---|---|---|---|---|
| CONCENTRATION (milli-mole/liter) | 5 | 5 | 5 | 5 | 5 | 5 | 5 | 5 | 5 | 2 | 5 | 5 | 3000 |

Moreover, in the following test, the total volume of the process liquid entered into the column is 30 cm$^3$.

(2) Column Preparation Step 1

The absorption, elution and recovery with respect to Zirconium, Molybdenum, Palladium and the rare earth elements were performed with the column-style. A jacketed glass column having an internal diameter of 1 cm and a length of 50 cm was used. The glass column was filled with the silica/polymer complex-carrier holding-type CMPO absorbent taking the form of slurry as in the case of the test shown in FIG. 2 under pressure. Water with a constant temperature controlled to 50° C. was recycled in the jacket, and the temperature of the column was controlled to 50° C.

until the completion of the test. 200 cm³, 3 mole/liter of nitric acid was then sent to an upper end of the column using a pump at a constant 5 cm³/minute pace to perform a conditioning of the absorbent.

(3) Absorption Step (First Absorption Step)

The process liquid was supplied to the upper end of the column using the pump at a constant 1 cm³/minute pace to absorb Zirconium, Molybdenum, Palladium and the rare earth elements in the absorbent.

(4) Cleansing Step 1

Following the absorption step 1, 50 cm³, 3 mole/liter of nitric acid solution was sent to the upper end of the column at a constant 1 cm³/minute rate in a like manner to the above in order to cleanse gaps formed between the absorbent and an inner wall of the column.

(5) Elution Step 1 (First Elution Step)

190 cm³, 0.05 mole/liter of DTPA-nitric acid solution (pH 2) was then supplied to the column at a constant 1 cm³/minute rate in a like manner to the above.

(6) Elution Step 2 (Second Elution Step)

140 cm³, pH 3.5 of dilute nitric acid solution was then supplied to the column at a constant 1 cm³/minute rate in a like manner to the above.

(7) Collection and Analysis 1

A fraction collector collected the effluent, which was discharged from a lower end of the column when the solution was supplied to the column, every 10 cm³. Concentrations of metals in each fractional effluent collected were analyzed quantitatively using an ICP (inductively coupled plasma spectrometry) to find out the relationship between the weight of effluent and the metal concentration in the effluent. The conclusions are shown in FIG. 3.

Figure 3:
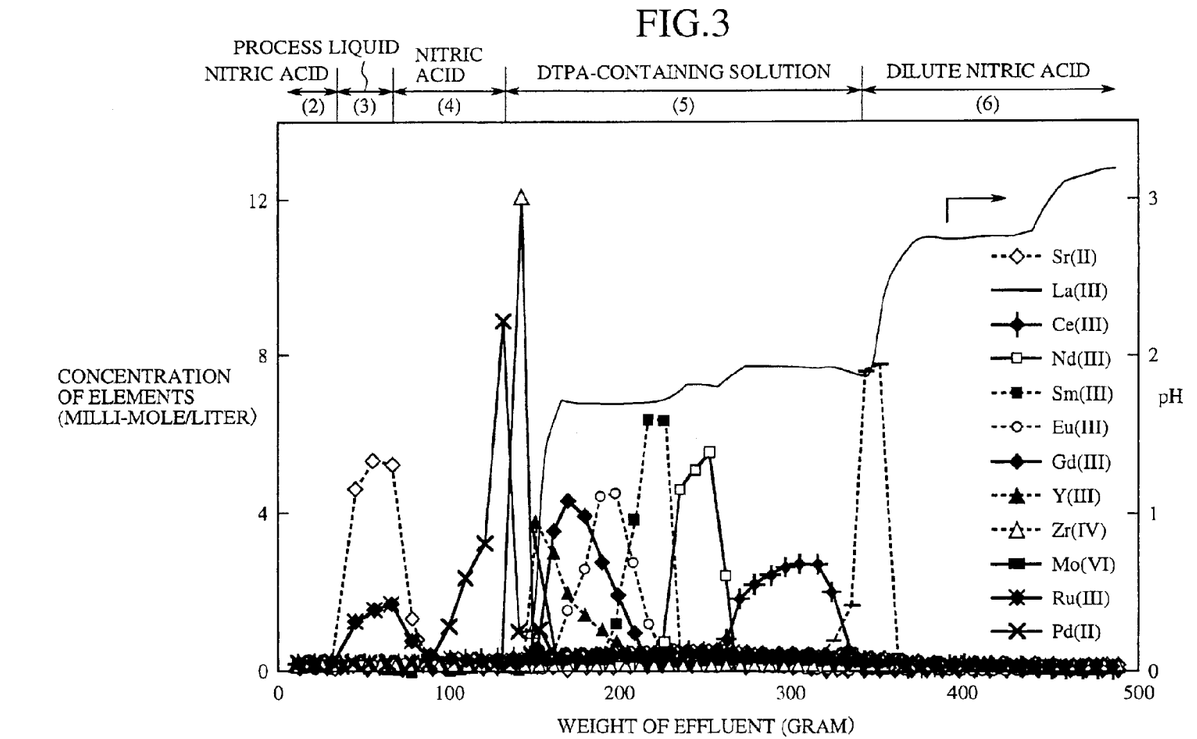
FIG. 3 is a graph of test conclusions of column-style separation performed using a simulated solutions high-level radioactive liquid wastes in example 1 according to the present invention.

It is apparent from FIG. 3 that the great majority of Strontium and Ruthenium in the process liquid supplied to the column in the absorption step 1 is not absorbed in the absorbent and is discharged together with the supplied process liquid and the cleansing liquid. On the other hand, the whole amount of the rare earth elements, Zirconium, Molybdenum and Palladium is absorbed in the absorbent in the absorption step above. Moreover, Zirconium, Molybdenum and the great majority of the rare earth elements were eluted effectively using 0.05 mole/liter of DTPA-nitric acid solution (pH 2) in the elution step 1 described above. A part of Palladium was eluted effectively using pH 3.5 of dilute nitric acid supplied in the elution step 2.

Moreover, the elution order of the rare earth elements illustrated in FIG. 3 is Yttrium, Gadolinium, Europium, Samarium, Neodymium, Cerium and Lanthanum. In other words, the larger the atomic number (heavy rare earth elements) the faster the elution. In this case, Yttrium belongs to the heavy rare earth elements on the chemical properties. On the other hand, since the absorptive behavior of the CMPO absorbent when absorbing Americium and Curium is similar to that of the same absorbent when absorbing the rare earth elements, it is expected that the whole amount of the elements is absorbed in the absorption step 1 described above. Considering the strength of the complex-forming ability between Americium, Curium and the rare earth elements and the DTPA, it is estimated that the elution behavior of the DTPA-containing solution when eluting Americium is similar to Yttrium and the elution of Curium is faster than that of Yttrium to some extent. It is apparent from the test conclusion of the example shown in FIG. 3 that almost all of Zirconium, Molybdenum, Yttrium and Gadolinium, about 50 percent of Palladium, about 77 percent of Europium, and about 29 percent of Samarium are mixed in the effluent containing Americium and Curium. It is expected that all of the rare earth elements (atomic number 65 to 71) heavier than Gadolinium is mixed therein. On the other hand, about 23 percent of Europium, about 71 percent of Samarium, 71 percent or more of Promethium, all of Neodymium and the rare earth elements (atomic number 57 to 59) lighter than Neodymium are not mixed in the effluent containing Americium and Curium. Therefore, it is apparent that this enables efficient separation of the elements above. The weight of the heavy rare earth elements contained usually in the high-level radioactive liquid wastes is 5 percent to 10 percent of the weight of all rare earth elements. Therefore, about 90 percent to 95 percent of the rare earth elements are separated from Americium and Curium in the elution step 2.

(8) Process Liquid Preparation Step 2 (Effluent Preparation Step)

Each nitrate of Samarium, Europium, Gadolinium, Yttrium, Zirconium and Palladium, or ammonium salt of molybdic acid is picked up as typical elements contained in the Americium and Curium-containing effluent, which is produced in the elution step 1 shown in FIG. 1 he each salt was dissolved in 3 mole/liter nitric acid solution in accordance with the composition in Table 2. The DTPA reagent was added to the solution so that the concentration of the DTPA in the solution is 0.05 mole/liter, and accordingly a process liquid (Americium and Curium-containing effluent-simulation solution in the elution step 1) was obtained.

TABLE 2

COMPOSITION OF PROCESS LIQUID FOR SEPARATION AND RECOVERY TEST (AMERICIUM AND CURIUM-CONTAINING EFFLUENT-SIMULATION SOLUTION IN THE ELUTION STEP 1)

| CONSTITUENT | Sm | Eu | Gd | Y | Zr | Mo | Pd | NITRIC ACID | DTPA |
|---|---|---|---|---|---|---|---|---|---|
| CONCENTRATION (milli-mole/liter) | 5 | 5 | 5 | 5 | 5 | 2 | 5 | 3000 | 50 |

Moreover, in the following test, the total volume of the process liquid entered into the column is 30 cm³.

(9) Column Preparation Step 2

The same absorbent and column as the column preparation step 1, which is described in (2) above, were used. Water controlled to a constant temperature of 50° C. was recycled in the jacket, and the temperature of the column was controlled to 50° C. until the completion of the test. 200 cm³, 3 mole/liter of nitric acid was then sent to the upper end of the column using the pump at a constant 5 cm³/minute rate to perform a conditioning of the absorbent.

(10) Absorption Step 2 (Second Absorption Step)

The process liquid was supplied to the upper end of the column using the pump at a constant 1 cm³/minute rate to absorb Zirconium, Molybdenum and the rare earth elements in the absorbent.

(11) Cleansing Step 2

Following the absorption step 2, 50 cm³, 3 mole/liter of nitric acid solution was sent to the upper end of the column at a constant 1 cm³/minute rate in a like manner above to cleanse gaps formed between the absorbent and the inner wall of the column.

(12) Elution Step 3 (Third Elution Step)

120 cm³ of distilled water was supplied to the column at a constant 1 cm³/minute rate in a like manner to the above.

(13) Cleansing Step 3

Following the elution step 3, 50 cm³, 3 mole/liter of nitric acid solution was sent to the upper end of the column at a constant 1 cm³/minute rate in a like manner above to cleanse gaps formed between the absorbent and the inner wall of the column.

(14) Elution Step 4 (Fourth Elution Step)

100 cm³, 0.05 mole/liter of DTPA-nitric acid solution (pH 2) was then supplied to the column at a constant 1 cm³/minute rate in a like manner to the above.

(15) Collection and Analysis 2

A fraction collector collected the effluent, which was discharged from a lower end of the column when the solution was supplied to the column, every 10 cm³. Concentrations of metals in each fractional effluent collected were analyzed quantitatively using an ICP (inductively coupled plasma spectrometry) to find out the relationship between the weight of effluent and the metal concentration in the effluent. The conclusions are shown in FIG. 4.

Figure 4:
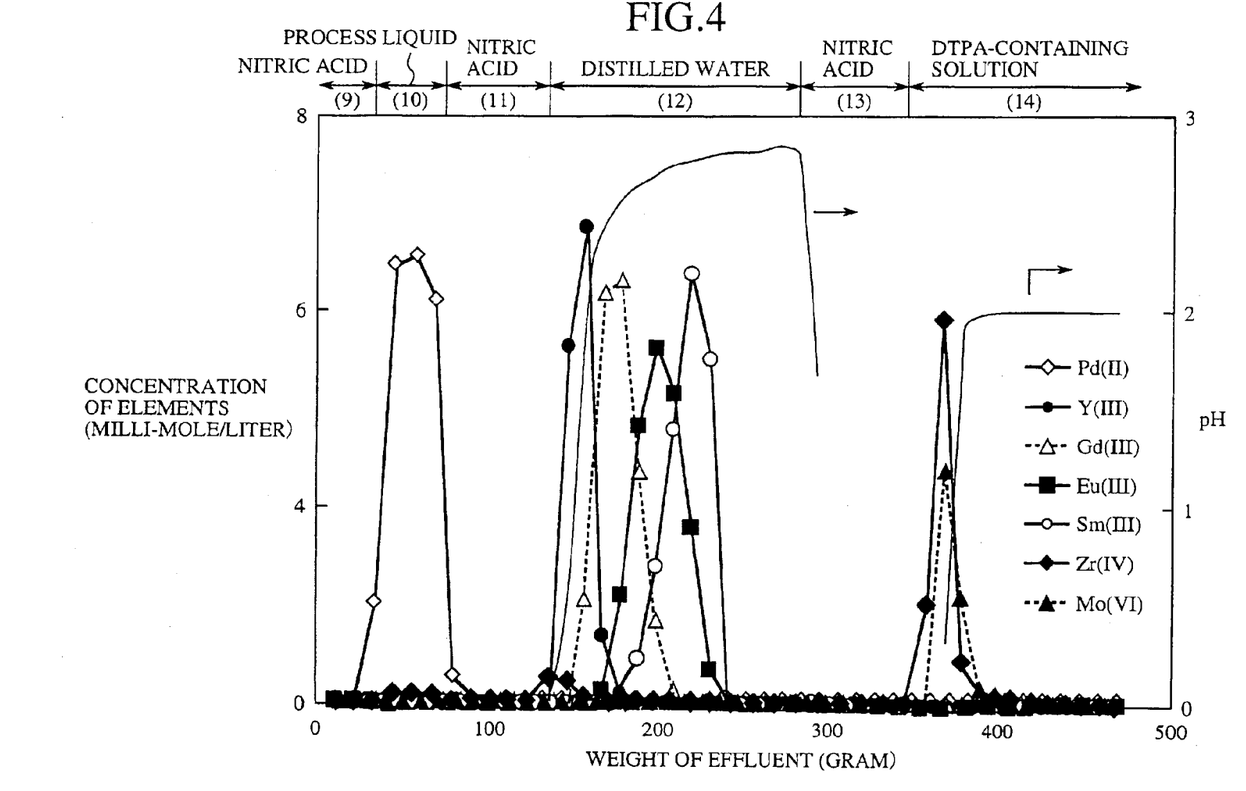
FIG. 4 is a graph of test conclusions of column-style separation performed using a simulated solution as a separated solution containing Americium and Curium in example 1 according to the present invention.

It is apparent from FIG. 4 that Palladium contained in the process liquid is not absorbed in the absorbent and is discharged together with the supplied process liquid and the cleansing liquid. On the other hand, the whole amount of the rare earth elements, Zirconium and Molybdenum is absorbed in the absorbent in the absorption step above. The distilled water supplied elutes effectively the rare earth elements in all in the elution step 3. Finally, Zirconium and Molybdenum are eluted effectively using 0.05 mole/liter of DTPA-nitric acid solution (pH 2), and are separated effectively from the rare earth elements. On the other hand, the absorptive behavior of the CMPO absorbent when absorbing Americium and Curium and the elution behavior using water or dilute nitric acid are similar to those of the same absorbent. It is therefore expected that the elements in all are mixed in the effluent containing the rare earth elements and are separated from Zirconium and Molybdenum.

As described above, according to the example 1, it is possible to separate and recover effectively Americium and Curium from wastes produced from spent nuclear fuel reprocessing. As a result, the rare earth elements mixed in recovered product containing Americium and Curium is about 5 percent to about 10 percent of the whole amount of the rare earth elements contained in the wastes to be reprocessed. It is furthermore possible to separate and recover effectively Zirconium, Molybdenum and Palladium from other elements. Accordingly, it is possible to improve the cost effectiveness, safety and efficiency in processing of high-level radioactive liquid wastes. At the same instant, since it is possible to use effectively Palladium as potential resources, it is expected that the present invention help developing a nuclear fuel-recycling project.

Moreover, with the example 1, the present invention tried out the separation and recovery of the elements from a process liquid simulating the high-level radioactive liquid wastes. It is possible to apply the present invention to the separation and recovery of the elements from a low- or middle-level radioactive liquid wastes without limiting to the high-level radioactive liquid wastes.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of separation and recovery of elements from radioactive liquid wastes, comprising:

a first absorption step of bringing into contact a high-level radioactive liquid waste containing separation target elements including Americium, Curium, Zirconium, Molybdenum, Palladium and rare earth elements with a solid absorbent containing organophosphorus compounds so that the separation target elements are absorbed in the solid absorbent;

a first elution step of bringing into contact the solid absorbent with an acidic solution containing diethylenetriaminepentaacetic acid so that Americium, Curium, Zirconium, Molybdenum, Palladium and heavy rare earth elements are eluted from the solid absorbent; and a second elution step of bringing into contact the solid absorbent underwent the first elution step with water or dilute nitric acid so that light rare earth elements are eluted from the solid absorbent.

2. A method of separation and recovery of elements from radioactive liquid wastes according to claim 1, wherein the solid absorbent containing organophosphorus compounds is a solid absorbent including:

a complex-carrier having porous silica carrier particles holding organic high polymers; and at least one of octyl(phenyl)-N,N-diisobutylcarbamoylmethylphosphine oxide or dihexyl-N,N-diethylcarbamoylmethphosphonate which is held on the complex-carrier.

3. A method of separation and recovery of elements from radioactive liquid wastes according to claim 1, further comprising:

a separated solution preparation step of adjusting the acid concentration of a separated solution to a range from 1 mole per liter to 6 mole per liter, the separated solution containing Americium and Curium obtained in the first elution step;

a second absorption step of bringing into contact the separated solution, whose acid concentration is adjusted in the separated solution preparation step, with solid absorbent containing organophosphorus compounds so that Americium, Curium, Zirconium, Molybdenum, Palladium and heavy rare earth elements are absorbed in the solid absorbent; and a third elution step of bringing into contact the solid absorbent obtained in the second absorption step with water or dilute nitric acid so that Americium, Curium and heavy rare earth elements are eluted from the solid absorbent.

4. A method of separation and recovery of elements from radioactive liquid wastes according to claim 3, wherein the solid absorbent containing organophosphorus compounds is a solid absorbent including:

a complex-carrier having porous silica carrier particles holding organic high polymers; and at least one of octyl(phenyl)-N,N-diisobutylcarbamoylmethylphosphine oxide or dihexyl-N,N-diethylcarbamoylmethphosphonate which is held on the complex-carrier.

5. A method of separation and recovery of elements from radioactive liquid wastes according to claim 3, further comprising:

a fourth elution step of bringing into contact the solid absorbent with an acidic solution containing diethylenetriaminepentaacetic acid so that Zirconium and Molybdenum are eluted from the solid absorbent.

6. A method of separation and recovery of elements from radioactive liquid wastes according to claim 5, wherein the solid absorbent containing organophosphorus compounds is a solid absorbent including:
- a complex-carrier having porous silica carrier particles holding organic high polymers; and
- at least one of octyl(phenyl)-N,N-diisobutylcarbamoylmethylphosphine oxide or dihexyl-N,N-diethylcarbamoylmethphosphonate which is held on the complex-carrier.

* * * * *